March 20, 1934.   W. D. WRIGHT   1,951,957
FRUIT PACKER
Filed July 30, 1929   2 Sheets-Sheet 1
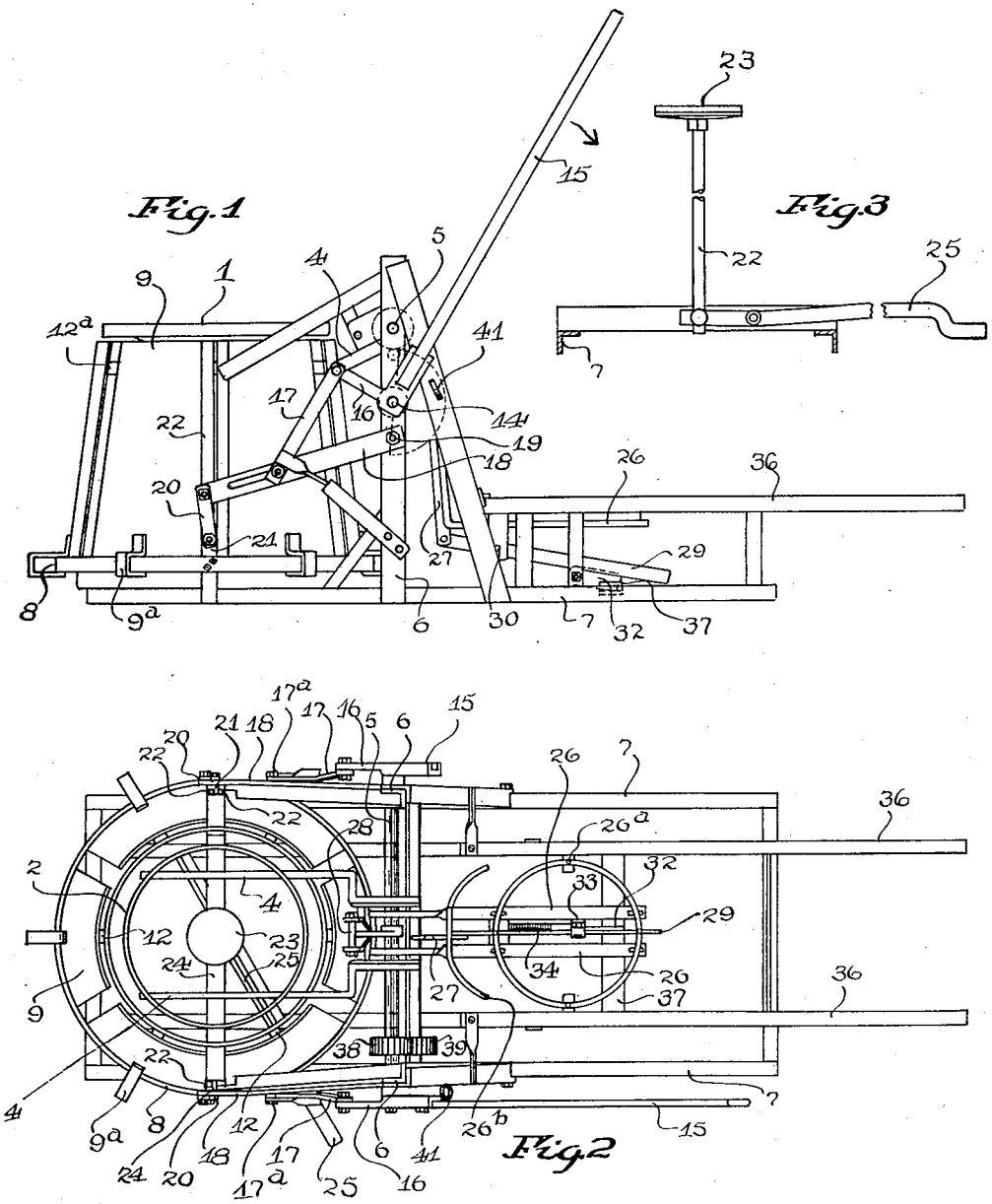
INVENTOR
William D. Wright
BY
H. H. Sims
his ATTORNEY March 20, 1934.  W. D. WRIGHT  1,951,957
FRUIT PACKER
Filed July 30, 1929   2 Sheets-Sheet 2
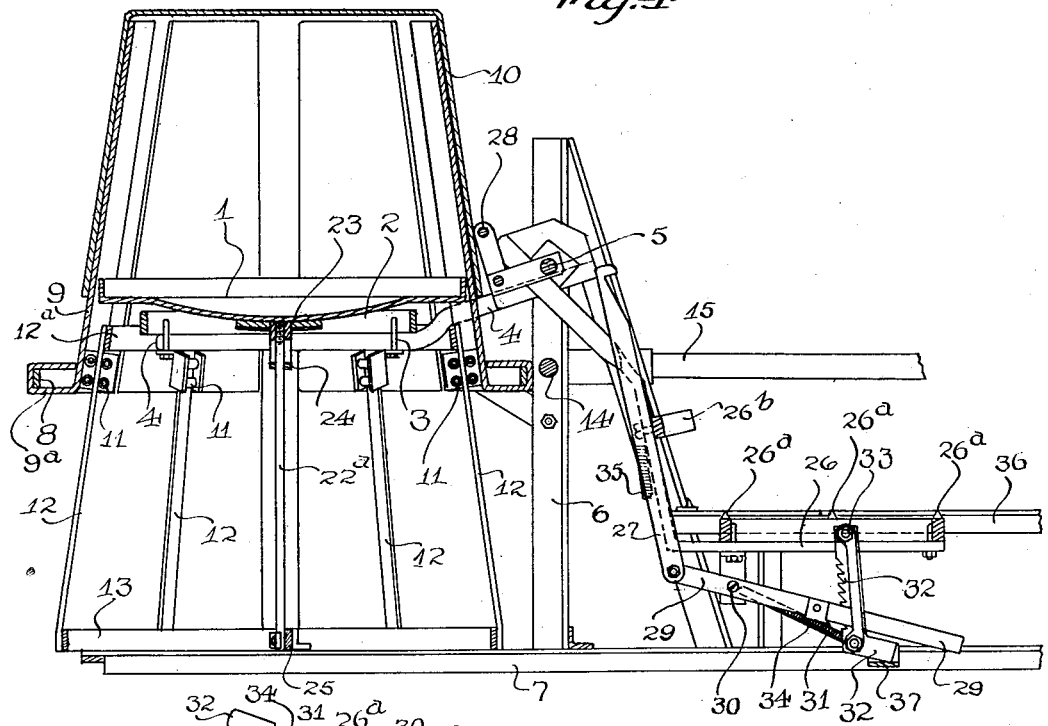
Fig. 4
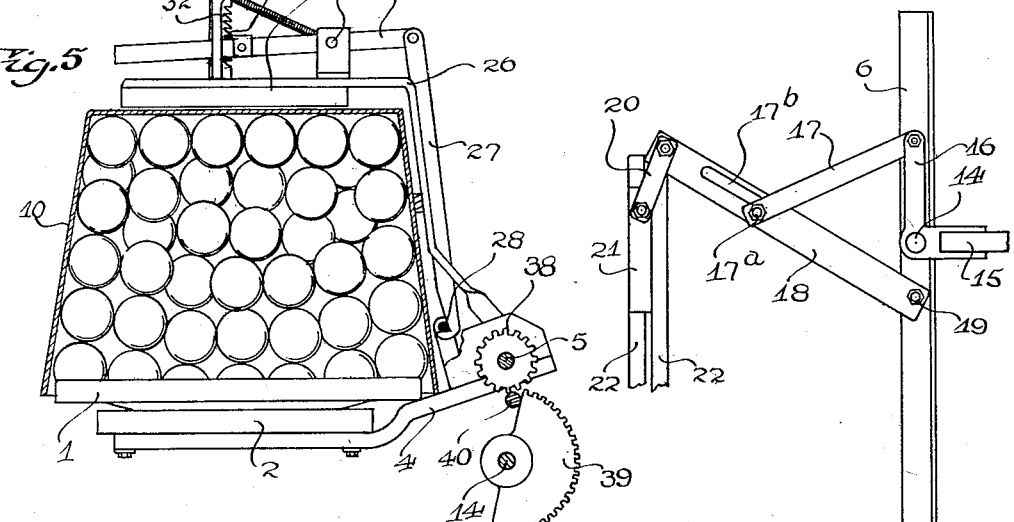
Fig. 5
Fig. 6
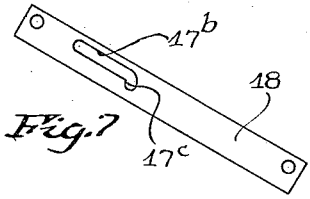
Fig. 7
INVENTOR
William D. Wright
BY
H. W. Simms
his ATTORNEY Patented Mar. 20, 1934

1,951,957

UNITED STATES PATENT OFFICE 1,951,957

FRUIT PACKER

William D. Wright, Brockport, N. Y.

Application July 30, 1929, Serial No. 382,242

7 Claims. (Cl. 226—17)

The present invention relates to fruit packers and an object of the invention is to provide a construction in which a receptacle may be fitted in an inverted position over a confining means in which the fruit to be packed is arranged and the confining means may be withdrawn from the receptacle leaving the fruit in the latter without turning the receptacle to an upright position and without any material readjustment of the fruit in the receptacle due to the withdrawal of the confining means. Another object of the invention is to provide a fruit facing member and a confining means relatively movable, the confining means having a plurality of relatively movable segments which may be withdrawn from the fruit container in which the fruit is to be packed without causing any material readjustment of the fruit in the receptacle in which the fruit is placed. Still another object of the invention is to provide means for agitating the fruit supported on the facing member while either the confining means or a receptacle is associated with the facing member. A further object of the invention is to provide mechanism for moving a facing member with a filled receptacle associated therewith to an inverted position to one side of a confining means.

To these and other ends, the invention consists of certain parts and combinations of parts all of which will be hereinafter described: the novel features being pointed out in the appended claims.

In the drawings:

Fig. 1 is a side view of a fruit packer constructed in accordance with this invention, the parts being shown in the positions they occupy before the fruit is placed on the facing member;

Fig. 2 is a plan view of the parts in the same positions with the facing member removed;

Fig. 3 is a detail view of the agitating means;

Fig. 4 is a view partially in vertical section showing the positions of the parts just prior to the withdrawal of the confining means and the securing of the basket or receptacle by the holding means of the latter, no fruit being shown in order that the illustration will be clearer;

Fig. 5 is a fragmentary view showing the manner in which the receptacle or basket is secured by the holding means;

Fig. 6 is a fragmentary view of the mechanism for moving the confining means relatively to the facing member; and Fig. 7 is a view of one of the swinging arms forming part of the mechanism shown in Fig. 6.

In the illustrated embodiment of my invention, 1 indicates a fruit facing member or disk which is removably supported on a supporting member 2, in this instance, in the form of a ring secured by shackles 3 to two arms 4 which are mounted to swing with a shaft 5 supported on uprights 6 projecting upwardly from a base frame 7.

For confining the fruit above the facing plate or disk 1, a confining means is provided comprising, in this instance, a ring 8 having a plurality of segments 9 projecting upwardly therefrom in slightly spaced relation the upper ends of the segments being free and their lower ends being guided at 9ª on the ring 8 so that relative movement between the segments may take place. These segments conform generally to the interior wall of a tapered fruit receptacle or basket 10 which is adapted to fit over them.

The confining means and the facing member or plate are relatively movable so that the confining means may be positioned below the plate or may be positioned to project above the plate. In this instance, the confining means moves relatively to the facing plate and to this end has a plurality of rollers 11 arranged in pairs on the different segments and engaging the inner and outer faces of the inclined guides 12 which are connected at their upper ends by a ring 12ª and at their lower ends by a ring 13. The inclined guides are parallel with the taper of the interior wall of the basket or receptacle so that the confining segments 9 move in straight lines substantially parallel with the tapered wall of the basket or receptacle.

Movement of the confining means may be effected in any suitable manner. In this instance, a rock shaft 14 is mounted to turn on the uprights 6 and has a lever arm 15 thereon by which said shaft is turned. Arms 16 are also provided on the rock shaft 15 and are connected by links 17 to swinging arms 18 pivoted at 19 to the uprights 6.

The links 17 have a lost motion connection with the arms 18 formed, in this instance, by slots 17ᵇ having notches 17ᶜ at their inner ends and in which are received the pivots 17ª. During the first part of the downward movement of the arms 18, the pivots 17ª lie in the notches 17ᶜ. After the confining means has reached its downward limit the pivots 17ª travel in the slot. On the return movement, the pivots 17ª first travel in the slots 17ᵇ without moving the arms 18 and when the notches 17ᶜ are again reached the arms 18 begin the swing upwardly. The arms 18 are connected by links 20 to slides 21 to which the ring 8 is secured. These slides 21 are guided on vertical uprights 22 supported by the base 7 on opposite sides of the guides of the confining means. By swinging the shaft 14 the ring 8 is raised and lowered causing the segments 9 to be raised and lowered on the guides 12 and to move on the ring 8 toward each other on rising and away from each other on lowering. The amount of movement of the segments on the ring 8 is such that the segments lie at all times in close proximity to the inner wall of the basket due to the fact that they travel on lines parallel with the tapered inner wall of the basket as determined by the position of the segments on the guides 12.

Means is provided for agitating the fruit in the confining means, or the receptacle or basket while it is in an inverted position over the facing plate. In this instance, this means comprises a vertically arranged plunger 22$^a$ having a head 23 at its upper end for cooperating with the bottom of the facing plate 1. This plunger is guided at 24 for vertical movement and has a lever 25 engaging its lower end and projecting to one side of the apparatus for engagement by a foot of the operative of the machine so as to impart a number of successive upward movements of the plunger in order to agitate the facing plate, and the fruit supported thereon.

Means is also provided for inverting a filled basket with the facing plate. This means, in this instance, comprises a basket holding member 26 having a bottom engaging portion 26$^a$ and a side engaging portion 26$^b$. This member is mounted to turn on the shaft 5 before mentioned in order that the basket engaging member may engage the basket 10 while the latter is above the facing plate. To lock the facing plate support 2 and the basket holding member 26, the basket holding member carries a locking device in the form of a pivoted bar 27 having its free end adopted for engagement with a keeper 28 on the facing plate support and its pivoted end attached to a lever 29 which is pivoted at 30 to the basket or container engaging member 26. This lever 29 carries a tooth 31 which is adapted to engage with teeth on a toothed bar or detent 32 pivoted at 33 to the basket engaging member. A spring 34 normally holds the toothed bar 32 toward the tooth 31 of the lever 29 to lock said lever and locking lever 27 against movement under the action of a spring 35 which tends to move the locking lever 27 away from the keeper 28. When a basket with the fruit therein and the facing plate are swung together to one side of the confining means, the bottom of the basket or container comes to rest on a pair of spaced bars or supports 36 while the toothed detent engages a stop 37 and thereby automatically releases the locking member 27 permitting the facing plate to be removed and the facing plate support to be swung again over the confining means.

A common means may be provided for operating the confining means, swinging the facing member support and swinging the receptacle holding means. This is accomplished in this instance by providing a gear 38 on the shaft 5 for engagement by a segmental gear 39 on the shaft 14, an eccentric arm or projection 40 being provided on the shaft 5 to cooperate with opposite ends of the gear segment 39 in order to prevent the gear 39 passing out of mesh with the gear 38. In this way, connection is made between the lever 15 and the mechanism for operating the confining means as well as between said lever and the mechanism for shifting the facing member support and the receptacle holding means.

The operation of the invention will be understood from the foregoing description but it may be summarized as follows:

While the parts are in position shown in Fig. 1, a facing of fruit is placed on the facing member 1 in the usual manner. The lever 15 is then shifted clockwise from the position shown in Fig. 1 until the parts reach the position shown in Fig. 4, except that the basket is not placed over the confining means. In this position the lever 15 is held by a yielding catch or stop 41. During this movement of the lever 15, the gears 39 and 38 do not mesh. The confining means is now filled with fruit and the basket is fitted over the confining means as shown in Fig. 4. The basket holding means is now swung by hand into engagement with the bottom of the inverted basket and the lever 29 is then depressed to cause the locking bar 27 to lock the basket holding means to the swinging support for the facing member as shown in Fig. 5. The lever 15 is now moved counter-clockwise, and during the first part of its movement the gear 39 does not mesh with the gear 38 so that the confining segments move independently of the facing number support and the basket or receptacle holding means to withdraw the confining means from the receptacle while the latter is in an inverted position over the facing member. About the time the confining means is withdrawn from the receptacle, the gear 39 enters into mesh with the gear 38 and swings the facing member support and the receptacle holding means to carry the filled basket or receptacle to an upright position on the supporting bars 36, the pivots 17$^a$ during this time travelling in the slots 17$^b$ so that no movement is imparted to the confining means. When the filled receptacle reaches the supports 36, the receptacle holding means is automatically unlocked from the fruit facing member by the engagement of the toothed bar 32 with the stop or abutment 37. The lever is now swung clockwise a short distance to the position shown in Fig. 1 causing the gear 39 to turn the support for the facing member to its position at the top of the confining means, leaving the filled basket on the support 36 to be capped and closed in the usual manner.

From the foregoing it will be seen that there has been provided a fruit packer in which a facing member and a confining means are relatively movable, the confining means being formed of segments movable relatively to each other on the relative movement between the facing member and the confining means so that the confining means may be withdrawn from the fruit container while the latter is in an inverted position without substantially disturbing the arrangement of the fruit presented to the receptacle or container by the facing member and the confining means. A means has been provided for agitating the fruit on the facing member while either the basket or the confining means is supporting such fruit on the facing member. Means is also provided for uprighting the fruit receptacle to one side of the confining means while the fruit is held in the receptacle by the facing member. A common means is provided for operating the uprighting means and the confining means having lost motion connection with both of said means, whereby the confining means operates when the uprighting means is stationary and vice versa.

What I claim as my invention and desire to secure by Letters Patent is:

1. A fruit packer comprising a facing member, a ring movable toward and from the facing member, segmental confining members arranged in converging relation to each other, and movable on the ring relatively to each other, and converging guides cooperating with the segmental confining members and effecting their relative movement on the movement of the ring relatively to the facing member.

2. In a fruit packer, the combination with a facing member, and a confining means for the facing member relatively movable to cause the facing member to be positioned at the top or the bottom of the confining means, of a support for the facing member mounted to swing to carry the facing member to an inverted position to one side of the confining means, and receptacle holding means for engaging a receptacle supported in an inverted position over the facing member, swinging with the facing member support to hold a receptacle to the facing member while the latter is moving to the inverted position, and means for locking the facing member support and the receptacle holding means together while the two are moving away from the confining means, and means located in the path of the locking means and arranged to trip the same and release the receptacle when the latter reaches the limit of its swinging movement.

3. In a fruit packer, the combination with a facing member, and a confining means movable relatively to the facing member so that the facing member may lie at the top or the bottom of the confining means, of a movable support for the facing member, and means for securing a receptacle in an inverted position over the facing member, and a common operating means for the confining means and the facing member support having lost motion connection with the confining means and the facing member support, to operate either one while the other is stationary.

4. The combination with a facing plate support and a confining means for confining a column of fruit on a facing plate on said support, of an uprighting means for uprighting a facing plate on the support with a receptacle in an inverted position over the facing plate, and a common operator having a lost motion connection with the confining means to move the latter from a lower non-confining position to an upper confining position and vice versa while the uprighting means is inoperative, and a lost motion connection with the uprighting means to move the latter to upright the receptacle and the facing member while the confining means is in non-confining position.

5. The combination with a facing plate support and a confining means for confining a column of fruit on a facing plate on said support, of an uprighting means for uprighting a facing plate on the support with a receptacle in an inverted position over the facing plate, a rock shaft, an operating lever on the rock shaft, an arm on the rock shaft, a pivotally supported arm having a link connection with the confining means, a lost motion connection between the pivotally supported arm and the arm on the rock shaft through which the operating lever and rock shaft may be moved independently of the pivotally supported arm when the confining means is in non-confining position, and a lost motion connection between the rock shaft and the uprighting means through which the uprighting means may be operated from the operating lever when the confining means is in non-confining position.

6. The combination with a facing plate support and a confining means for confining a column of fruit on a facing plate on said support, of an uprighting means for uprighting a facing plate on the support with a receptacle in an inverted position over the facing plate, a rock shaft, an operating lever for the rock shaft, a lost motion operating connection between the rock shaft and the confining means through which the operating lever and the rock shaft may be moved independently of the confining means while the latter is in non-confining position, a segmental gear on the rock shaft, and a gear connected to the uprighting means and engaged and moved by the segmental gear on the rock shaft during the time the rock shaft is being operated independently of the confining means.

7. In a fruit packer, the combination with a swingable support for a facing member, of a swingable receptacle holding means having a portion adapted to engage a basket on the swingable support and mounted to swing with and relatively to the support, locking means for holding the swingable receptacle holding means to the swingable support to cause the two to swing together, and means located in the path of the locking means and arranged to trip the same and release the receptacle when the swinging support and the holding means have swung to a certain position, so that the swingable support may be returned to its original position independently of the swingable holding means.

WILLIAM D. WRIGHT.

CERTIFICATE OF CORRECTION.

Patent No. 1,951,957.  March 20, 1934.

WILLIAM D. WRIGHT.

It is hereby certified that error appears in the printed specification of the above numbered patent requiring correction as follows: Page 3, after line 129, insert the following as claim 8:

8. A fruit packer comprising a facing member, confining means including a ring, movable toward and from the facing mamber, a plurality of confining segments cooperating guiding portions on the ring and the segments for guiding the latter transversely of the line of movement of the ring, and means cooperating with the segments and effecting the relative movement thereof on the movement of the ring.

And that the said Letters Patent should be read with this correction therein that the same may conform to the record of the case in the Patent Office.

Signed and sealed this 15th day of May, A. D. 1934.

Bryan M. Battey (Seal)  Acting Commissioner of Patents.